United States Patent
Phannam et al.

(10) Patent No.: US 12,367,369 B2
(45) Date of Patent: Jul. 22, 2025

(54) PRELAM BODY OF A SMART CARD, SMART CARD, METHOD OF FORMING A PRELAM BODY AND METHOD OF FORMING A SMART CARD

(71) Applicant: LINXENS HOLDING, Mantes la Jolie (FR)

(72) Inventors: Somchard Phannam, Phra Nakorn si Ayutthaya (TH); Thanapong Photisarn, Phra Nakorn si Ayutthaya (TH); Arporn Sungkhapun, Phra Nakorn si Ayutthaya (TH); Khiengkrai Khusuwan, Phra Nakorn si Ayutthaya (TH)

(73) Assignee: LINXENS HOLDING, Mantes-la-Jolie (FR)

( * ) Notice: Subject to any disclaimer, the term of this patent is extended or adjusted under 35 U.S.C. 154(b) by 0 days.

(21) Appl. No.: 18/027,026

(22) PCT Filed: Jul. 22, 2021

(86) PCT No.: PCT/EP2021/070476
§ 371 (c)(1),
(2) Date: Mar. 17, 2023

(87) PCT Pub. No.: WO2022/058072
PCT Pub. Date: Mar. 24, 2022

(65) Prior Publication Data
US 2023/0376719 A1   Nov. 23, 2023

(30) Foreign Application Priority Data

Sep. 18, 2020 (EP) .................................... 20306055

(51) Int. Cl.
*G06K 19/077* (2006.01)
*B32B 37/18* (2006.01)

(52) U.S. Cl.
CPC ...... *G06K 19/07722* (2013.01); *B32B 37/185* (2013.01); *G06K 19/07773* (2013.01); *B32B 2425/00* (2013.01)

(58) Field of Classification Search
CPC ........ G06K 19/07722; G06K 19/07773; B32B 37/185; B32B 2425/00
(Continued)

(56) References Cited

U.S. PATENT DOCUMENTS 8,534,561 B2    9/2013  Michau et al.
10,922,601 B2 *  2/2021  Herslow .................. B32B 9/02
(Continued)

FOREIGN PATENT DOCUMENTS

KR       20190139441 A     12/2019

OTHER PUBLICATIONS

International Search Report and Written Opinion for related International Application No. PCT/EP2021/070476, dated Oct. 18, 2021, 12 pages.

*Primary Examiner* — Michael G Lee
*Assistant Examiner* — David Tardif
(74) *Attorney, Agent, or Firm* — DITTHAVONG, STEINER & MLOTKOWSKI

(57) ABSTRACT

The present invention provides for a prelam body of a smart card, a smart card, a method of forming a prelam body of a smart card, and a method of forming a smart card. In accordance with some embodiments herein, a prelam body comprises a base substrate formed of at least one layer, and at least one overlay sheet layer formed on one side of the base substrate, wherein the at least one overlay sheet layer has a recess formed therein. The recess is at least partially extending through the at least one overlay sheet layer such that an opening of the recess is exposed.

21 Claims, 2 Drawing Sheets

(58) Field of Classification Search
USPC .......................................................... 235/488
See application file for complete search history.

(56) References Cited

U.S. PATENT DOCUMENTS

| | | | |
|---|---|---|---|
| 2010/0288842 A1 | 11/2010 | Elbaz et al. | |
| 2012/0175422 A1 | 7/2012 | Zambon | |
| 2018/0326777 A1* | 11/2018 | Reddy | B42D 25/387 |
| 2021/0110231 A1* | 4/2021 | Finn | G06K 19/025 |

* cited by examiner

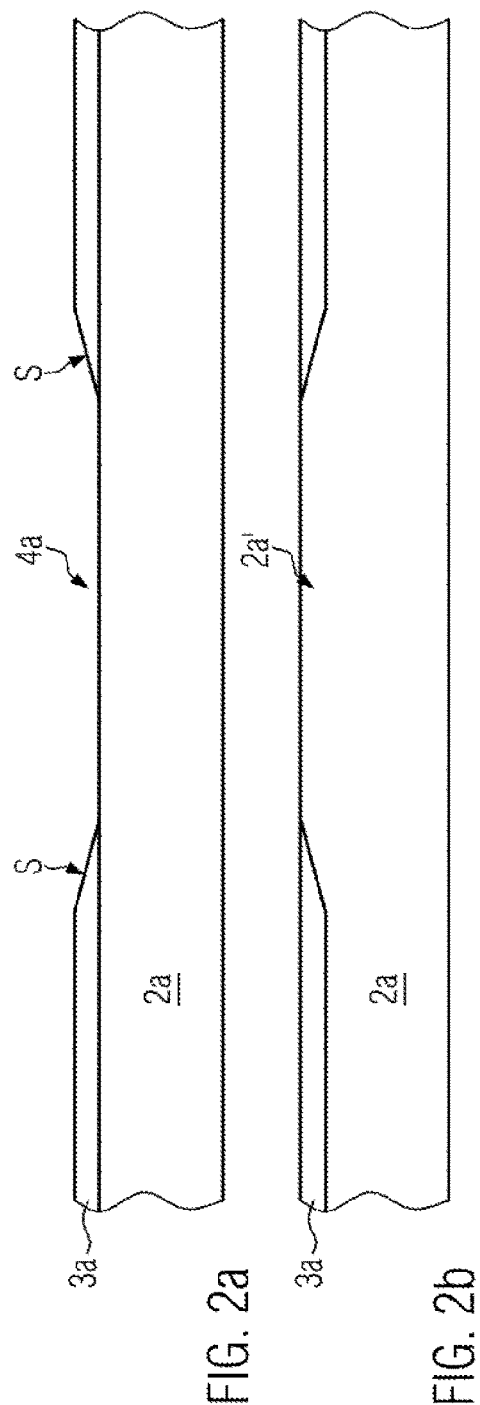
FIG. 2a
FIG. 2b
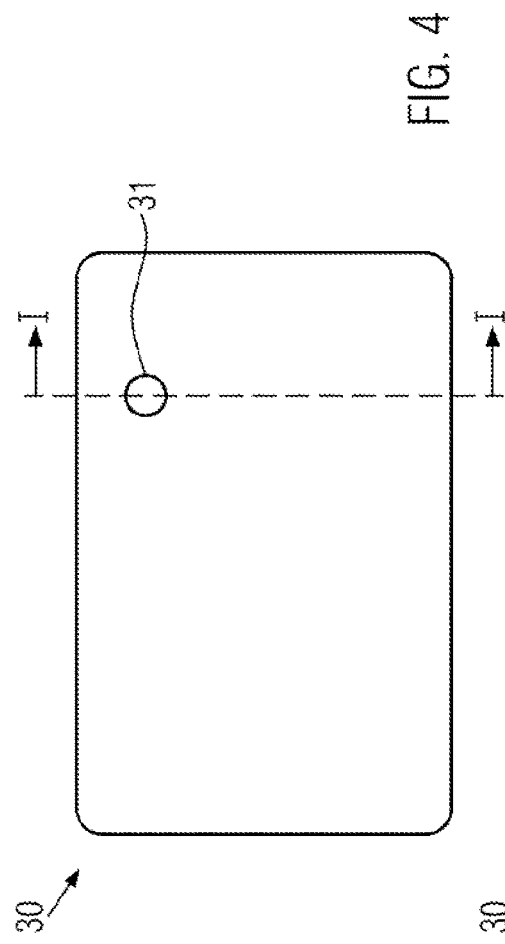
FIG. 4
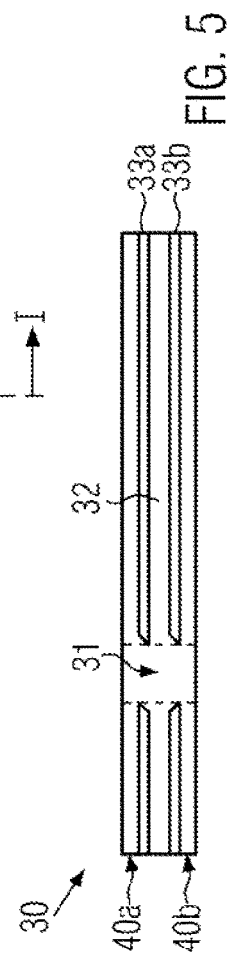
FIG. 5

PRELAM BODY OF A SMART CARD, SMART CARD, METHOD OF FORMING A PRELAM BODY AND METHOD OF FORMING A SMART CARD

FIELD OF THE INVENTION

The present invention relates to a prelam body of a smart card, a smart card, a method of forming a prelam body of a smart card, and a method of forming a smart card.

BACKGROUND

Smart cards, or identification cards, are increasingly used for making financial transactions, providing access to premises, and allowing identification of a smart card holder by integrating personal information into the card, for example. Generally, a smart card comprises means for storing and transmitting data, optionally also for receiving data and/or processing stored and/or transmitted data. The transmittance and/or reception of data may be contactless using an electromagnetic field and/or involve one or more contacts provided in a surface of a smart card. Therefore, a smart card may be considered as being part of a complex system, the smart card interacting with entities within the complex system via one or more interfaces depending on an intended application of the smart card. An example of an interface is given by a card terminal of contact type, contactless type or of a mixture of both types. In any case, a smart card generally includes at least one integrated circuit module comprising at least one of a memory module, a processor module and an antenna module.

Since a smart card is the only component that a user commonly has in hands, there is an ongoing task of developing multifunctional cards that unite functions associated to various types of applications, into a single smart card. Several standards have been developed for smart cards of contact-type, contactless type or hybrid type. These standards specify stringent requirements on the structure and performance of a smart card and its components. In particular, the relevant ISO/IEC standards are especially significant for smart cards because these standards are based on a broad international consensus and define the fundamental properties of smart cards such that smart cards are compatible with a great number of card terminals in all over the world. Therefore, the relevant ISO/IEC standards are to be strictly observed in any smart card fabrication process in order to ensure that fabricated smart cards comply with the relevant ISO/IEC standards. The person skilled in the art is thus assumed to be aware of the relevant ISO/IEC standards and to take them into account when developing smart cards.

As smart cards contain sensible information of its holder and/or grant authorization for its holder, it is important to equip smart cards with security features that allow to protect a smart card against unintended access to its functions, as well as to make a smart card save against fraud and forgery. For example, "window" features are included into current identity cards for protecting an identity card against forgery and/or manipulation. Basically, a window is punched out during the fabrication process and a security pattern is provided in the void of the window. After filling the remaining void of the window with an appropriate plug, the card is exposed to hot lamination, fusing the material together into a monolithic card body of the smart card under fabrication. In case of manipulation of the "window" feature, the integrity of the "window" feature is damaged. Therefore, "window" features represent security features that allow to optically inspect the validity or authenticity of a smart card, which is particularly useful for smart identity cards.

Conventionally, these "window" features require a piece of material to be inserted as a plug into the void of the window in order to fill the void. In this way, formation of voids and air pockets is avoided. For example, voids and air pockets may reduce the mechanical robustness of a smart card. However, preparing and inserting plugs into voids and air pockets add complexity to the fabrication process of a smart card with "window" feature due to the small dimensions of the plugs and complicated insertion and handling processes of such plugs, thereby increasing fabrication costs.

BRIEF SUMMARY

The above issues of conventional smart cards with "window" feature are overcome by a prelam body as defined in claim 1, a smart card as defined in claim 8, a method of forming a prelam body as defined in claim 10, and a method of forming a smart card as defined in claim 17. More advantageous embodiments thereof are defined in the dependent claims 2 to 7, dependent claim 9, dependent claims 11 to 16, and dependent claims 18 to 21.

In the present disclosure, the expression "prelam body" as used herein is understood as representing a prelaminated body with multiple layers of an insulating material, such as PVC, PC or some other appropriate thermoplastic polymer, which multiple layers are pre-laminated together. Such a prelaminated body may be considered as representing an intermediate product obtained during fabrication of a smart card. For example, an illustrative prelam body may be obtained by fusing together different layers of a thermoplastic material into a single homogeneous sheet body, thereby forming a monolithic substrate body. In some illustrative examples of a prelam body, the substrate body (or base substrate) may have at least one contact and/or interconnection embedded therein, optionally with one or more electronic modules integrated into the substrate body in electric connection with at least one contact and/or interconnection of the substrate body.

In a first aspect of the present disclosure, a prelam body is provided. In accordance with some illustrative embodiments of the first aspect, the prelam body comprises a base substrate formed of at least one layer, such as at least two layers mounted together, and at least one overlay sheet layer formed on one side of the base substrate. For example, the prelam body may have at least two overlay sheet layers formed at opposing sides of the base substrate. The at least one one overlay sheet layer formed on one side of the base substrate has a recess formed therein, the recess at least partially extending through the at least one overlay sheet layer on one side of the base substrate such that an opening of the recess is exposed. Accordingly, the issues of conventional smart cards with "window" features are avoided by omitting a filling of the recess in the prelam body. In this way, the fabrication processes of prelam bodies may be simplified and fabrication costs may be optimized.

In some more illustrative embodiments of the first aspect, the recess may be a through hole exposing a surface region of the base substrate. A through hole represents a recess that may be easily formed, for example, by punching or ablation processes, such as lase ablation. Furthermore, a through hole exposes a portion of an underlying layer or pattern.

In some more illustrative embodiments of the first aspect, the at least one overlay sheet layer interfacing the recess may have tapering sidewalls. For example, the at least one overlay sheet layer interfacing the recess may assume tapering sidewalls (in other words, slanted or sloped sidewalls relative to a normal direction of an upper surface of the at least one overlay sheet layer on one side of the base substrate in which overlay sheet layer(s) the recess is formed, or relative to a normal direction of an upper surface of the base substrate) due to being partially filled. For example, when providing the prelam body as a monolithic body as a result to fusing the layers together by thermal lamination, the recess may be partially filled by material from the base substrate and optionally by a melting of the material of the overlay sheet layer due to application of a thermal process. In this way, edges of the interface between the at least one overlay sheet layer and the recess may be less sharp and the recess may be less pronounced in an upper surface of the prelam body. Accordingly, the issue of voids and air pockets in a smart card made from the prelam body may be at least attenuated.

In some more illustrative embodiments of the first aspect, the recess may be in alignment with an electronic module embedded into the base substrate, such that a portion of the electronic module may be directly below the recess in a normal direction of the overlay sheet layer. Accordingly, the recess may allow to use that portion of the electronic module below the recess as a feature to be accessible via the recess.

In some more illustrative embodiments of the first aspect, the electronic module may comprise an antenna module. Accordingly, the prelam body may be of the contactless-type.

In some more illustrative embodiments of the first aspect, the base substrate may be formed of a transparent material and/or a translucent material, such as transparent PC and/or translucent PC and/or transparent PVC and/or translucent PVC. Accordingly, the base substrate may have advantageous mechanical and optical properties.

In some more illustrative embodiments of the first aspect, at least one of the at least one overlay sheet layer formed on one side of the base substrate may be formed of an opaque material, such as white PC and/or white PVC. Accordingly, the prelam body may have advantageous mechanical and optical properties.

In a second aspect of the present disclosure, a smart card is provided. In accordance with some illustrative embodiments herein, the smart card comprises the prelam body of the first aspect, and at least one additional layer covering the at least one overlay sheet layer on one side of the base substrate. For example, when the prelam body has at least two overlay sheet layer formed on opposing sides of the base substrate, at least two additional layers covering the two overlay sheet layers of the prelam body may be formed. Herein, the recess the at least one overlay sheet layer formed on one side of the base substrate is at least partially filled with material of the base substrate and/or with material of the at least two additional layers. Accordingly, the issues of conventional smart cards with "window" features are avoided by omitting a filling of the recess in the prelam body of the smart card. In this way, the fabrication processes of smart cards may be simplified and fabrication costs may be optimized.

In some more illustrative embodiments of the second aspect, the at least one additional layer may be formed of a transparent material and/or a translucent material, such as transparent PC and/or translucent PC and/or transparent PVC and/or translucent PVC. Accordingly, the smart card may have advantageous mechanical and optical properties In a third aspect of the present disclosure, a method of forming a prelam body of a smart card is provided. In accordance with some illustrative embodiments herein, the method comprises preparing a base substrate having at least one layer. For example, in case of at least two layers, the base substrate may be prepared by mounting the at least two layers together. The method further comprises covering one surface of the base substrate with at least one overlay sheet layer, and forming a recess in the at least one overlay sheet layer. For example, at least two overlay sheet layers may be formed such that two opposite surfaces of the base substrate are covered by the at least two overlay sheet layers. The recess at least partially extends through the at least one overlay sheet layer such that an opening of the recess is exposed. Accordingly, the issues involved with the fabrication of conventional smart cards with "window" features are avoided by omitting a filling of the recess in the prelam body. In this way, the fabrication processes may be simplified and fabrication costs may be optimized.

In some more illustrative embodiments of the third aspect, the recess may be a through hole exposing a surface region of the base substrate on the side covered by the at least one overlay sheet layer. A through hole represents a recess that may be easily formed, for example, by punching or ablation processes, such as lase ablation. Furthermore, a through hole exposes a portion of an underlying layer or pattern.

In some more illustrative embodiments of the third aspect, the method may further comprise performing a thermal lamination process after the at least one recess is formed. Accordingly, the prelam body may be provided as a monolithic body.

In some more illustrative embodiments of the third aspect, the recess may be formed in alignment with an electronic module embedded into the base substrate. Hereby, a portion of the electronic module may be directly below the recess in a normal direction of the overlay sheet layer. Accordingly, the recess may allow to use that portion of the electronic module below the recess as a feature to be accessible via the recess.

In some more illustrative embodiments of the third aspect, the electronic module may comprise an antenna module. Accordingly, the prelam body may be of the contactless-type.

In some more illustrative embodiments of the third aspect, the base substrate may be formed of a transparent material and/or a translucent material, such as transparent PC and/or translucent PC and/or transparent PVC and/or translucent PVC. Accordingly, the base substrate may have advantageous mechanical and optical properties.

In some more illustrative embodiments of the third aspect, at least one of the at least one overlay sheet layer may be formed of an opaque material, such as white PC and/or white PVC. Accordingly, the prelam body may have advantageous mechanical and optical properties.

In a fourth aspect of the present disclosure, a method of forming a smart card is provided. In accordance with some illustrative embodiments herein, the method comprises providing the prelam body of the first aspect, and forming a stacked body configuration by mounting at least one additional layer on the one side of the base substrate for covering the at least one overlay sheet layer of the prelam body. Accordingly, the issues involved with the fabrication of conventional smart cards with "window" features are avoided by omitting a filling of the recess in the prelam body of the smart card. In this way, the fabrication processes for smart cards may be simplified and fabrication costs may be optimized.

In some more illustrative embodiments of the fourth aspect, providing the prelam body may comprise forming the prelam body with the method of the third aspect. This is an optimized way of providing the prelam body.

In some more illustrative embodiments of the fourth aspect, the method may further comprise subjecting the stacked body configuration to a lamination process for forming an integral body configuration. Accordingly, the smart card may be formed as a monolithic object.

In some more illustrative embodiments of the fourth aspect, the lamination process may be a thermal lamination process, resulting in a monolithic smart card body, wherein the recess is at least partially filled with material of the base substrate and/or material of the at least one additional layer. This is an advantageous way of obtaining a monolithic smart card.

In some more illustrative embodiments of the fourth aspect, the at least one additional layer may be formed of a transparent material and/or a translucent material, such as transparent PC and/or translucent PC and/or transparent PVC and/or translucent PVC. Accordingly, the smart card may have advantageous mechanical and optical properties.

BRIEF DESCRIPTION OF THE DRAWINGS

Further aspects and illustrative embodiments of the present disclosure will be described in greater detail in connection with the accompanying drawings in the detailed description below, wherein the drawings are not to scale.

FIG. 2a schematically illustrates an enlarged view of some illustrative examples of the illustrative embodiments disclosed with regard to FIG. 1, while FIG. 2b schematically illustrates an enlarged view of some other illustrative examples of the illustrative embodiments disclosed with regard to FIG. 1.

FIG. 4 schematically illustrates in a top view a smart card in accordance with some illustrative embodiments of the present disclosure.

FIG. 5 schematically illustrates a cross-sectional view along the line I-I in FIG. 4.

DETAILED DESCRIPTION

Figure 1:
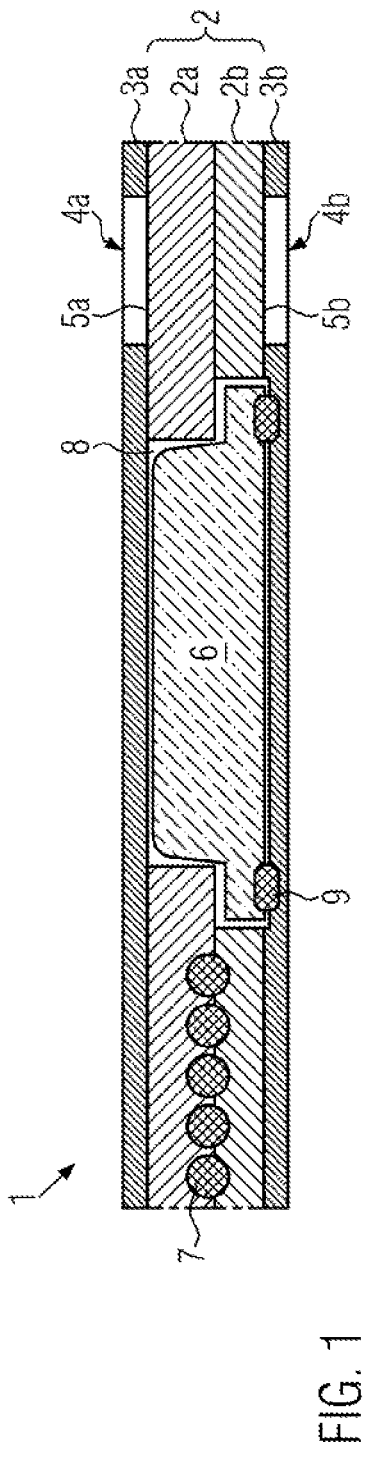
FIG. 1 schematically illustrates in a cross-sectional view a prelam body in accordance with some illustrative embodiments of the present disclosure.

With regard to FIGS. 1 and 2, a prelam body 1 in accordance with various illustrative embodiments of the present disclosure will be described. FIG. 1 schematically shows a cross-sectional view of the prelam body 1, while FIG. 2 schematically shows an enlarged portion of the cross-sectional view in FIG. 1.

Referring to FIG. 1, the prelam body 1 comprises a base substrate 2 and two overlay sheet layers 3a and 3b. The two overlay sheet layers 3a and 3b are formed at opposing sides of the base substrate 2. In particular, the base substrate 2 is sandwiched between the two overlay sheet layers 3a and 3b. For example, the overlay sheet layer 3a may be formed on an upper surface of the base substrate 2, while the overlay sheet layer 3b is formed on a bottom surface of the base substrate 2. However, this does not pose any limitation on the present disclosure and only one overlay sheet layer 3a or 3b may be formed on one side of the base substrate 2 or more than one overlay sheet layers may be formed on only one side of the base substrate 2.

In accordance with some illustrative embodiments and without limitation, the base substrate 2 may comprise at least two layers mounted together, e.g. a layer 2a (optionally referred to as an "inlay sheet"), and a layer 2b (optionally referred to as a "top sheet"). In accordance with some illustrative examples, the inlay sheet 2a may be provided by a transparent PC layer having a thickness in a region from 100 µm to about 200 µm preferably, with a thickness of about 150 µm. Furthermore, the layer 2b may be provided by a transparent PC layer having a thickness in the region of about 50 µm to about 250 µm, preferably at about 100 µm. This does not pose any limitation and PVC may be employed instead of PC without deviating from the scope of the present disclosure. However, the person skilled in the art will appreciate that any appropriate thermoplastic material, e.g., a thermoplastic polymer, may be used for the layers 2a and 2b. However, this does not pose any limitation on the present disclosure and the base substrate 2 may only be formed by one of the layers 2a and 2b or the base substrate 2 may be formed by more than the two layers 2a and 2b.

In accordance with some illustrative examples of the prelam body 1 shown in FIG. 1, the base substrate 2 may have vertically and horizontally extending contact lines (not illustrated) embedded into the base substrate 2, although these contact lines are not explicitly depicted in the illustration of FIG. 1.

In accordance with some illustrative examples herein, the overlay sheet layers 2a and 2b may be formed by a PC or PVC material layer. This does not pose any limitation to the present disclosure and any thermoplastic material, e.g., a thermoplastic polymer, may be employed as an appropriate material for each of the overlay sheet layers 3a and 3b. For example, at least one of the overlay sheet layers 3a and 3b may be formed of an opaque material, for example, white PC and/or white PVC, or any other colored opaque PC or PVC material. Furthermore, in case of one of the overlay sheet layers 3a and 3b being formed by an opaque material, the other one of the overlay sheet layers 3a and 3b may be formed by a transparent or translucent material, e.g., similar or equal to the material of the base substrate 2. Accordingly, at least one side of the base substrate 2 may be covered by an opaque material.

In accordance with some special illustrative examples herein, each of the overlay sheet layers 3a and 3b may have a thickness in the range of 20 µm to 80 µm, preferably with a thickness of about 50 µm. The person skilled in the art will appreciate that specific values depend on an overall design of a prelam body and that a thickness of less than about 20 µm or more than about 80 µm may be used instead.

With continued reference to FIG. 1, the overlay sheet layer 3a may have a recess 4a formed therein. The recess 4a may represent a through hole exposing a surface region 5a of the base substrate 2 at the side of the overlay sheet layer 3a. However, this does not pose any limitations to the present disclosure and the recess 4a may only partially extend through the overlay sheet layer 3a such that an opening of the recess 4a is exposed. Alternatively or additionally, a recess 4b may be formed in the overlay sheet layer 3b at the opposite side of the prelam body 1, the recess 4b exposing a surface region 5b of the flat base substrate 2 at the bottom side of the base substrate 2. In accordance with some illustrative embodiments herein, the recess 4a and/or 4b may be formed by a punching or ablation process, e.g., laser ablation. In accordance with some special illustrative examples, the recesses 4a and 4b may be in alignment with each other such that the recesses 4a and 4b are provided at a position with regard to each other that the recesses 4a and 4b substantially overlay each other in a top view of the prelam body 1. In accordance with some illustrative but not limiting examples herein, the recess 4a may be formed in an opaque material and the recess 4b may be formed in an opaque material or at least one of the overlay sheet layers 3a and 3b may be provided by a transparent and/or translucent material as described above. Without limitation, a recess is only formed in an opaque material layer.

Referring to FIG. 2a, some illustrative examples of the illustrative embodiments disclosed with regard to FIG. 1 are schematically illustrated. Herein, a portion of the cross-sectional view of FIG. 1 is illustrated in FIG. 2a in an enlarged view to depict a portion of the prelam body 1 in proximity to the recess 4a in greater detail. Particularly, FIG. 2a schematically shows the recess 4a together with the inlay sheet 2a of the base substrate. Accordingly, the cross-sectional view in FIG. 2a shows an upper portion of the cross-sectional view in FIG. 1 for some illustrative examples in greater detail.

With continued reference to FIG. 2a and in accordance with some illustrative examples, the recess 4a may have sidewalls S, the sidewalls S being sloped or tapered such that the recess 4a has tapering sidewalls S. Similarly, the recess 4b in FIG. 1 may have tapering sidewalls also not explicitly illustrated in FIG. 1 when considering the illustrative examples shown in FIG. 2a. This does not pose any limitation to the present disclosure and the recess 4a and/or 4b may instead remain to have a sharp contour, i.e., the sidewalls may substantially be orthogonal to an upper surface of the inlay sheet 2a of the base substrate 2. The term substantially may indicate an acceptable tolerance of ±30%, preferably 20%, more preferably 15%, even more preferably 10%, even more preferably 5%, even more preferably 1%. The tapering sidewalls S may result from the prelam body 1 of FIG. 1 being subjected to a thermal lamination process in which the layers 3a, 3b and the base substrate 2 are fused together in the thermal lamination process. Due to the applied heat in the thermal lamination process, the recess 4a, having a sharp edge after a punching of the recess 4a, may assume tapering sidewalls S due to a partial filling of the recess 4a during the thermal lamination or maintain a sharp contour or assume a substantially sharp contour. In some special illustrative examples, a sharp edge of the recess 4a in the surface of the overlay sheet layer 3a may be softened to be less sharp and the recess 4a may be less pronounced. In accordance with some illustrative examples of the embodiments as described with regard to FIGS. 1 and 2a, the recess 4a in FIG. 2a may be partially filled by material of the underlying layer 2a or may remain substantially unfilled by the material of the layer 2a.

Referring to FIG. 2b, some other illustrative examples of the illustrative embodiments disclosed with regard to FIG. 1 are schematically illustrated as an alternative to the illustrative examples disclosed with regard to FIG. 2a. Herein, a portion of the cross-sectional view of FIG. 1 is illustrated in FIG. 2b in an enlarged view to depict a portion of the prelam body 1 in proximity to the recess 4a in greater detail after a lamination procedure is performed. Particularly, FIG. 2b schematically shows that the recess 4a of FIG. 1 is substantially filled by material of the inlay sheet 2a of the base substrate 2 and, possibly also with material of the layer 3a. Accordingly, the cross-sectional view in FIG. 2b shows an upper portion of the cross-sectional view in FIG. 1 for some illustrative other examples in greater detail.

With continued reference to FIG. 2b and in accordance with some other illustrative examples, the material of the layer 2a may substantially fill the recess 4a of FIG. 1 during a lamination process. The term "substantially fill" means that the recess 4a is filled at least to a degree of 50% of the volume of the recess 4a in FIG. 1, e.g., to a degree of at least 60% or to at least 70% or to at least 80% or to at least 90% or to at least 95% or to at least 99%. For example, due to conditions to which the prelam body 1 in FIG. 1 is exposed during a lamination procedure, material of the layer 2a may be extruded to substantially fill the recess 4a in FIG. 1 as it is indicated by reference numeral 2a' in FIG. 2b showing an extruded portion 2a' of the material of the layer 2a after lamination. Optionally, the overlay sheet layer 3a may also partially fill the recess 4a in FIG. 1 such that sidewalls of the overlay sheet layer 3a may become tapering. This does not pose any limitation to the present disclosure and material of the overlay sheet layer 3a may have an interface to the material of the layer 2a being extruded into the recess 4a assuming a sharp contour, i.e., the sidewalls may substantially be orthogonal to an upper surface overlay sheet layer 3a. The term substantially may indicate an acceptable tolerance of ±30%, preferably 20%, more preferably 15%, even more preferably 10%, even more preferably 5%, even more preferably 1%.

In accordance with some illustrative examples of a lamination process possibly used herein, a thermal lamination process may employ temperatures in the range of about 90° C. and pressures in the range of about 0.3 kg/cm$^2$ to about 16 kg/cm$^2$, with one or more steps of applying heat and pressure. For example, a process step may be applied for a time interval in the range up to about 45 minutes. For example, but without limitation, a relatively high temperature of about 110-135° C., such as about 120° C., or of about 145-180° C. may be used in producing an initial laminate. A pressure during this process step may be in the range from about 12 to 16 kg/cm$^2$, such as about 14 kg/cm$^2$. This process step may be performed for about 25 to 35 minutes, such as about 30 minutes. In addition, a process step with a lower temperature may be subsequently used with a temperature of about 90 to about 105° C., such as about 100° C. In this additional process step, the pressure may be of about 0.3 to 0.8 kg/cm$^2$, such as about 0.5 kg/cm$^2$, and the time period may be in the range from about 0.3 to 0.8 minutes, such as about 0.5 minutes. For example, in a PC lamination a temperature of about 145-180° C. for about 30 minutes, e.g., 165° C. for about 30 minutes, and a cooling for about 40 minutes may be performed in a lamination process. In case of a PVC lamination, a temperature in a range from about 110 to 135° C. may be applied together with an appropriate cooling.

In accordance with some illustrative embodiments of the present disclosure, the prelam body 1 of FIG. 1 may be formed by preparing the base substrate 2, e.g. by mounting at least the layers 2a and 2b together. Subsequently, two opposite side surfaces of the base substrate 2 are covered with the overlay sheet layers 3a and 3b. Thereafter, the recesses 4a and 4b may be formed so as to at least partially extend to the overlay sheet layer 3a and 3b, respectively. Subsequently, a thermal lamination process may be performed after the recesses 4a and 4b are formed. For example, the thermal lamination may be a hot lamination process. For example, at least one recess may be formed by punching out or any other cutting processes, such as laser ablation and the like.

Figure 3:
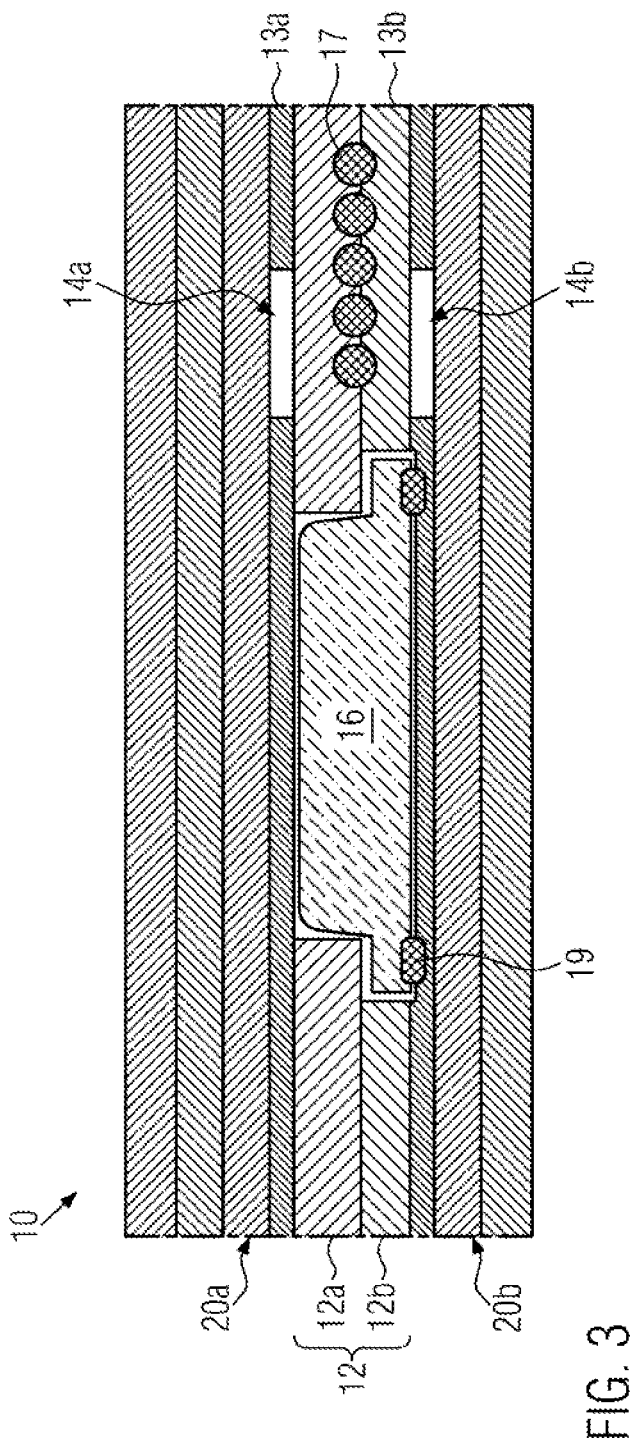
FIG. 3 schematically illustrates in a cross-sectional view, a smart card in accordance with some illustrative embodiments of the present disclosure.

Referring to FIG. 3, a smart card 10 is schematically illustrated in a cross sectional view. The smart card 3 comprises a prelam body formed by a base substrate 12 and two overlay sheet layers 13a and 13b. The two overlay sheet layers 13a and 13b are formed at opposing sides of the base substrate 12. In particular, the base substrate 12 is sandwiched between the two overlay sheet layers 13a and 13b. For example, the overlay sheet layer 13a may be formed on an upper surface of the base substrate 12, while the overlay sheet layer 13b is formed on a bottom surface of the base substrate 12.

In accordance with some illustrative embodiments, the base substrate 12 may comprise at least two layers mounted together, e.g. a layer 12a (optionally referred to as an "inlay sheet"), and a layer 12b (optionally referred to as a "top sheet"). In accordance with some illustrative examples, the inlay sheet 12a may be provided by a transparent PC layer having a thickness in a region from 100 µm to about 200 µm preferably, with a thickness of about 150 µm. Furthermore, the layer 12b may be provided by a transparent PC layer having a thickness in the region of about 50 µm to about 150 µm, preferably at about 100 µm. This does not pose any limitation and PVC may be employed instead of PC without deviating from the scope of the present disclosure. However, the person skilled in the art will appreciate that any appropriate thermoplastic material, e.g., a thermoplastic polymer, may be used for the layers 12a and 12b.

However, the above description of the smart card 10 does not pose any limitation on the present disclosure and the smart card 10 may have a base substrate 12 formed of only one layer and only on one side of the base substrate 12, there may be formed at least one overlay sheet layer, similar to the disclosure provided in the context of FIG. 1 above, the disclosure of which is incorporated by reference.

In accordance with some illustrative examples of the smart card 10 shown in FIG. 3, the base substrate 12 may have vertically and horizontally extending contact lines (not illustrated) embedded into the base substrate 12, although these contact lines are not explicitly depicted in the illustration of FIG. 3.

In accordance with some illustrative examples herein, the overlay sheet layers 12a and 12b may be formed by a PC or PVC material layer. This does not pose any limitation to the present disclosure and any thermoplastic material, e.g., a thermoplastic polymer, may be employed as an appropriate material for each of the overlay sheet layers 13a and 13b. For example, at least one of the overlay sheet layers 13a and 13b may be formed of an opaque material, for example, white PC and/or white PVC, or any other colored opaque PC or PVC material.

In accordance with some special illustrative examples herein, each of the overlay sheet layers 13a and 13b may have a thickness in the range of 25 µm to 75 µm, preferably with a thickness of about 50 µm. The person skilled in the art will appreciate that specific values depend on an overall design of a prelam body and that a thickness of less than about 25 µm or more than about 75 µm may be used instead.

With continued reference to FIG. 3, the overlay sheet layer 13a may have a recess 14a formed therein. The recess 14a may represent a through hole extending through the overlay sheet layer 13a and exposing a surface region 15a of the base substrate 12 at the side of the overlay sheet layer 13a. However, this does not pose any limitations to the present disclosure and the recess 14a may only partially extend through the overlay sheet layer 13a. Alternatively or additionally, a recess 14b may be formed in the overlay sheet layer 13b at the opposite side of the base substrate 2, the recess 14b exposing a surface region 15b of the base substrate 12 at the bottom side of the base substrate 12. In accordance with some illustrative embodiments herein, the recess 14a and/or 14b may be formed by a punching or ablation process, e.g., laser ablation. In accordance with some special illustrative examples, the recesses 14a and 14b may be in alignment with each other such that the recesses 14a and 14b are provided at a position with regard to each other that the recesses 14a and 14b substantially overlay each other in a top view of the smart card 10.

The person skilled in the art will appreciate that the smart card 10 may have a prelam body in correspondence with the prelam body 1 described above with regard to FIG. 1 and FIG. 2a or 2b, the disclosure of which is incorporated by reference.

With continuing reference to FIG. 3, an electronic module may be embedded into the base substrate 12. As an illustrative example and without limitation, the electronic module may comprise a chip module 16 and a module antenna 17 realized as a coil embedded into the base substrate 12. The chip module 16 may be also embedded into the base substrate 12 in accordance with known techniques, e.g. by recessing the base substrate 12 and accommodating the chip module 16 into the recess, as well as bonding the chip module 16 to contact lines (not illustrated) routed in the base substrate 12 for electrically coupling the chip module 16 and the module antenna 17. Furthermore, bonding pads 19 forming a mechanical and/or electrical coupling to the chip module 16, may be present.

On each of the overlay sheet layers 13a and 13b, one or more additional layers 20a and 20b may be formed. For example, at least one additional layer 20a may be formed on the overlay sheet layer 13a, covering the overlay sheet layer 13a and the recess 14a. Similarly, one or more additional layers 20b may be formed on the overlay sheet layer 13b, covering the overlay sheet layer 13b and the recess 14b. In accordance with some illustrative embodiments, the additional layers may be formed of a transparent and/or translucent material, such as transparent and/or translucent PC and/or transparent and/or translucent PVC. In general, the additional layers 20a and 20b may be provided by a thermoplastic material, e.g., a thermoplastic polymer, with preferably transparent or translucent properties. Furthermore, each of the additional layers may have a thickness in the range from about 25 µm to about 150 µm, for example. For example, a number of additional layers may be determined together with an appropriate thickness so as to provide the smart card 10 with a thickness in the range for about 450 µm to about 550 µm, such as a thickness of about 500 µm.

In accordance with some illustrative embodiments, the additional layers may be mounted to the overlay sheet layer 13a, 13b and an accordingly formed stacked body configuration may be subjected to a thermal lamination process such as a hot lamination. In the thermal lamination process, the recess may be at least partially filled with material from the base substrate 12 and/or the additional layers 20a, 20b. Accordingly, the recesses 14a and 14b may obtain tapering sidewalls (not illustrated in FIG. 3) in accordance with the tapering sidewalls S shown in FIG. 2. The description of the tapering sidewalls S in FIG. 2 is incorporated by reference. The person skilled in the art will appreciate that the recesses 14a and 14b may not be completely filled with the material of the base substrate 12 and/or of the additional layers 20a, 20b, in which case air pockets may be present in the smart card 10. Alternatively, the smart card 10 may have after thermal lamination no air pockets present, in which case a boundary may be present between the material of the overlay sheet layers 13a and 13b and material completely filling the recesses 14a, 14b. This boundary may be visible due to different optical properties of the overlay sheet layer 13a and 13b and the additional layers 20a and 20b and the base substrate 12.

In accordance with some illustrative examples, an illustrative thermal lamination process may employ temperatures in the range of about 90° C. and pressures in the range of about 0.3 kg/cm² to about 16 kg/cm², with one or more steps of applying heat and pressure. For example, a process step may be applied for a time interval in the range up to about 45 minutes. For example, but without limitation, a relatively high temperature of about 110-135° C., such as about 120° C., may be used in producing an initial laminate. A pressure during this process step may be in the range from about 12 to 16 kg/cm², such as about 14 kg/cm². This process step may be performed for about 25 to 35 minutes, such as about 30 minutes. In addition, a process step with a lower temperature may be subsequently used with a temperature of about 90 to about 105° C., such as about 100° C. In this additional process step, the pressure may be of about 0.3 to 0.8 kg/cm², such as about 0.5 kg/cm², and the time period may be in the range from about 0.3 to 0.8 minutes, such as about 0.5 minutes. For example, in a PC lamination a temperature of about 145-180° C. for about 30 minutes, e.g., 165° C. for about 30 minutes, and a cooling for about 40 minutes may be performed in a lamination process. In case of a PVC lamination, a temperature in a range from about 110 to 135° C. may be applied together with an appropriate cooling.

Referring to FIG. 4, a schematic top view of a smart card 30 is schematically illustrated. The smart card 30 may be fabricated in accordance any fabrication described above in the context of the smart card 10 of FIG. 3, the disclosure of which is incorporated by reference. Accordingly, the smart card 30 may in accordance with some illustrative but not limiting embodiments of the present disclosure, correspond to the smart card 10 of FIG. 3 as described above.

Referring to FIG. 4, the smart card 30 has a "window" feature 31 formed therein. With regard to FIG. 5, a cross-sectional view of the smart card 30 along the lines I-I in FIG. 4 is schematically illustrated. In view of the cross-sectional view in FIG. 5, the window feature 31 represents a portion of transparent and/or translucent material extending completely through a thickness of the smart card 30, particularly completely extending through an overlay sheet layer 33a and 33b of the smart card 30. The overlay sheet layer 33a and 33b may correspond to the overlay sheet layers 3a and 3b and/or the overlap sheet layer 13a and 13b described above. The overlay sheet layers 33a and 33b sandwich a base substrate 32 which corresponds to the base substrate 2 and/or the base substrate 12 described above. Furthermore, one or more additional layers 40a and 40b are formed on the overlay sheet layers 33a and 33b for covering the overlay sheet layer 33a and 33b. The additional layers 40a and 40b may correspond to the additional layers 20a and 20b described above.

In the illustration of FIG. 5, the "window" feature 31 is indicated by broken lines as representing a channel of transparent and/or translucent material extending completely through a thickness of the smart card 30. However, similar to the description of FIG. 2a or 2b above, the overlay sheet layer 33a and 33b may have tapering sidewalls at the window feature 31 due to a thermal lamination to which the smart card 30 is exposed.

Also FIGS. 1 to 5 above are described in the context of a recess being formed in each of the overlay layers, this does not pose any limitation in the present disclosure and at least one recess in at least one overlay sheet layer may be formed instead.

Although the smart card 30 shown in FIGS. 4 and 5 does not explicitly show additional features, such as one or more electronic modules incorporated into the smart card 30. This does not pose any limitation to the present disclosure and the person skilled in the art would appreciate that the smart card 30 illustrated in FIGS. 4 and 5 may have one or more electronic modules incorporated therein.

Although the prelam bodies described above with regard to FIGS. 1 to 3 show an electronic module as integrated into a base substrate, this does not pose any limitation to the present disclosure and any electronic module may be omitted in such prelam bodies.

Although electronic modules are described with regard to an antenna module, this does not pose any limitation to the present disclosure and any kind of module may be provided in the smart card and prelam body, respectively, instead. A non-exhaustive list of modules comprises processor modules, memory modules, transmitter modules, receiver modules, encryption modules, security modules, display modules, optical modules such as light emitting and/or light receiving modules etc.

In accordance with some illustrative embodiments, the at least one recess as described above with regard to FIGS. 1 to 3, may be used for providing a "window" feature as described above. For example, a security pattern, e.g., a photo image of a holder of a smart card, is provided at a bottom of the at least one recess. After lamination, the recess with the security pattern may be at least partially filled by material of the base substrate and/or of additional layers covering the at least one recess. Accordingly, the "window" feature may represent a security pattern that allows to identify the card holder. This "window" feature may not be manipulated without damaging the smart card, thereby allowing to identify the holder of the smart card. However, this example is only presented for illustrative purpose and not intended for limiting the present disclosure.

In summary, the present disclosure provides for a prelam body of a smart card, a smart card, a method of forming a prelam body of a smart card, and a method of forming a smart card. In accordance with some embodiments herein, a prelam body comprises a base substrate formed of at least two layers mounted together, and two overlay sheet layers formed at opposing sides of the base substrate, wherein at least one of the two overlay sheet layers has a recess formed therein. The recess is at least partially extending through the overlay sheet layer such that an opening of the recess is exposed.

The invention claimed is:

1. A prelam body of a smart card, comprising:
   a base substrate formed of at least one layer of thermoplastic material;
   at least one overlay sheet layer formed of thermoplastic material and on one side of the base substrate over a surface of the base substrate; and
   a security feature including a window feature formed of a recess,
   wherein the at least one overlay sheet layer has a recess formed therein, the recess at least partially extending through the at least one overlay sheet layer on the one side of the base substrate and at most onto the surface of the base substrate such that an opening of the recess is exposed.

2. The prelam body of claim 1, wherein the recess is a through hole exposing a surface region of the base substrate.

3. The prelam body of claim 2, wherein the at least one overlay sheet layer interfacing the recess has tapering sidewalls.

4. The prelam body of claim 1, wherein the recess is in alignment with an electronic module embedded into the base substrate, such that a portion of the electronic module is directly below the recess in a normal direction of the overlay sheet layer.

5. The prelam body of claim 4, wherein the electronic module comprises an antenna module.

6. The prelam body of claim 1, wherein the base substrate is formed of a transparent material and/or a translucent material, such as transparent PC and/or translucent PC and/or transparent PVC and/or translucent PVC.

7. The prelam body of claim 1, wherein at least one of the at least one overlay sheet layer formed on one side of the base substrate is formed of an opaque material, such as white PC and/or white PVC.

8. A smart card, comprising:
a prelam body comprising a base substrate formed of at least one layer of thermoplastic material;
at least one overlay sheet layer formed of thermoplastic material and on one side of the base substrate over a surface of the base substrate; and
a security feature including a window feature formed of a recess,
wherein the at least one overlay sheet layer has a recess formed therein, the recess at least partially extending through the at least one overlay sheet layer on the one side of the base substrate and at most extending onto the surface of the base substrate such that an opening of the recess is exposed; and
at one additional layer covering the at least one overlay sheet layer formed on one side of the prelam body,
wherein the recess in the at least one overlay sheet layer is at least partially filled with material of the base substrate and/or with material of the at least one additional layer.

9. The smart card of claim 8, wherein the at least one additional layer is formed of a transparent material and/or a translucent material, such as transparent PC and/or translucent PC and/or transparent PVC and/or translucent PVC.

10. A method of forming a prelam body of a smart card, the method comprising:
preparing a base substrate comprising at least one layer of thermoplastic material;
forming at least one overlay sheet layer of thermoplastic material and on one side of the base substrate for covering one surface of the base substrate with the at least one overlay sheet layer; and
forming a security feature including a window feature by forming a recess in the at least one overlay sheet layer, the recess at least partially extending through the at least one overlay sheet layer and at most onto the surface of the base substrate such that an opening of the recess is exposed.

11. The method of claim 10, wherein the recess is a through hole exposing a surface region of the base substrate.

12. The method of claim 10, further comprising performing a thermal lamination process after the at least one recess is formed.

13. The method of claim 10, wherein the recess is formed in alignment with an electronic module embedded into the base substrate, such that a portion of the electronic module is directly below the recess in a normal direction of the at least one overlay sheet layer.

14. The method of claim 13, wherein the electronic module comprises an antenna module.

15. The method of claim 10, wherein the base substrate is formed of a transparent material and/or a translucent material, such as transparent PC and/or translucent PC and/or transparent PVC and/or translucent PVC.

16. The method of claim 10, wherein at least one of the at least one overlay sheet layer is formed of an opaque material, such as white PC and/or white PVC.

17. A method of forming a smart card, the method comprising:
providing the prelam body of the smart card, wherein the prelam body comprises a base substrate formed of at least one layer of thermoplastic material, and at least one overlay sheet layer formed on one side of the base substrate over a surface of the base substrate, wherein the at least one overlay sheet layer has a security feature including a window feature formed of a recess formed therein, the recess at least partially extending through the at least one overlay sheet layer on the one side of the base substrate and at most onto the surface of the base substrate such that an opening of the recess is exposed; and
forming a stacked body configuration by mounting at least one additional layer to the one side of the base substrate for covering the at least one overlay sheet layer of the prelam body.

18. The method of claim 17, wherein providing the prelam body comprises forming the prelam body with another method comprising:
preparing a base substrate comprising at least one layer of a thermoplastic material;
forming at least one overlay sheet layer of a thermoplastic material on one side of the base substrate for covering one surface of the base substrate with the at least one overlay sheet layer; and
forming a security feature including a window feature by forming a recess in the at least one overlay sheet layer, the recess at least partially extending through the at least one overlay sheet layer such that an opening of the recess is exposed.

19. The method of claim 17, further comprising subjecting the stacked body configuration to a lamination process for forming an integral body configuration.

20. The method of claim 19, wherein the lamination process is a thermal lamination process, resulting in a monolithic smart card body, wherein the recess is at least partially filled with material of the base substrate and/or material of the at least two additional layers.

21. The method of claim 17, wherein the at least one additional layer is formed of a transparent material and/or a translucent material, such as transparent PC and/or translucent PC and/or transparent PVC and/or translucent PVC.

* * * * *